United States Patent [19]
Gibson

[11] 3,788,264
[45] Jan. 29, 1974

[54] COOLING SHROUD FOR AIRBOAT

[76] Inventor: Ivan A. Gibson, 1339 W. Washington St., Orlando, Fla. 32805

[22] Filed: May 22, 1972

[21] Appl. No.: 255,346

[52] U.S. Cl. .............................. 115/1 R, 123/41.7
[51] Int. Cl. ............................................... B60f 3/00
[58] Field of Search ........ 115/1 R, 5 R; 114/66.5 R; 123/41.7, 41.6, 41.66, 41.65, 41.64, 41.56; 244/53 R, 53 B

[56] References Cited
UNITED STATES PATENTS
3,500,784  3/1970  Reynolds......................... 114/66.5 R OTHER PUBLICATIONS
Franklin Aircooled, Bulletin No. 15, Aircooled Motors Corp. 1938.

Primary Examiner—George E. A. Halvosa
Assistant Examiner—Edward R. Kazenske
Attorney, Agent, or Firm—William M. Hobby et al.

[57] ABSTRACT

An airboat having an engine mounted thereon for driving a propeller and having an engine cooling shroud attached thereto is provided for cooling the engine more effectively with the air drawn thereacross. The shroud is shaped to form a venturi between the air inlet and outlet to increase the velocity of the air over the engine and to draw air between the cooling fins on the engine cylinders. Baffle plates are utilized to direct the flow of the air through the finned cylinders at an increased velocity.

6 Claims, 4 Drawing Figures

PATENTED JAN 29 1974

COOLING SHROUD FOR AIRBOAT

BACKGROUND OF THE INVENTION

The present invention relates to air boats in which an aircraft type engine is mounted on a boat hull for driving a propeller for propelling the boat through the water or over the snow, and more specifically, the present invention relates to a cooling shroud or cowling to increase the efficiency of the cooling of the engine.

In the past shrouds and cooling shrouds have been commonly provided on air cooled engines such as those commonly used on lawn mowers or air-cooled cars to more effectively direct the flow of air over the engine for more effective cooling. Airplane cowlings are also designed to direct the flow of air over and through an aircraft engine. However, it has not been common to provide cooling shrouds for air boats, and because of the hard use these engines are subjected to, because of the frequent varying of the speed of the engine and by the reduced airflow, the engines tend to operate at a higher temperature level resulting in a shortened engine life between overhauls. At least one prior art company has suggested adding a shroud to an airboat engine, which shroud is the more usual design for drawing the air over the engine.

The present invention, on the other hand, provides an airboat cooling shroud which has a venturi section to increase the velocity of air at predetermined sections over the engine and also is used in conjunction with baffles which draw larger volumes of air of higher velocity through the cooling fins of the engine cylinders to increase the efficiency of the cooling of the engine.

SUMMARY OF THE INVENTION

The present invention relates to an airboat having an aircraft engine mounted thereon and having an engine cooling shroud mounted to the engine. The airboat engine drives a propeller which propels the boat and the engine is an aircooled type having finned cylinders for the cooling of the cylinders and cylinder heads. An engine cooling shroud is fixedly attached to the engine to form a passageway thereover for passage of air over the engine and the shroud is shaped to have a slightly enlarged inlet portion for receiving air and an enlarged outlet portion for the air to pass out of the passageway, and a narrowed portion between the inlet and outlet portions for creating a venturi in the passageway formed between the shroud and the engine to increase the velocity of the air passing therethrough. The venturi is positioned to draw additional air through finned cylinders into the airstream and baffle plates are provided between the finned cylinders of the engine and the propeller to force a larger volume of air at a high velocity through the fins on the cylinders to further increase the efficiency of the cooling of the engine.

BRIEF DESCRIPTION OF THE DRAWINGS

Other objects, features and advantages of this invention will be apparent from a study of the wirtten description and the drawings in which.

DESCRIPTION OF THE PREFERRED EMBODIMENT

Figure 1:
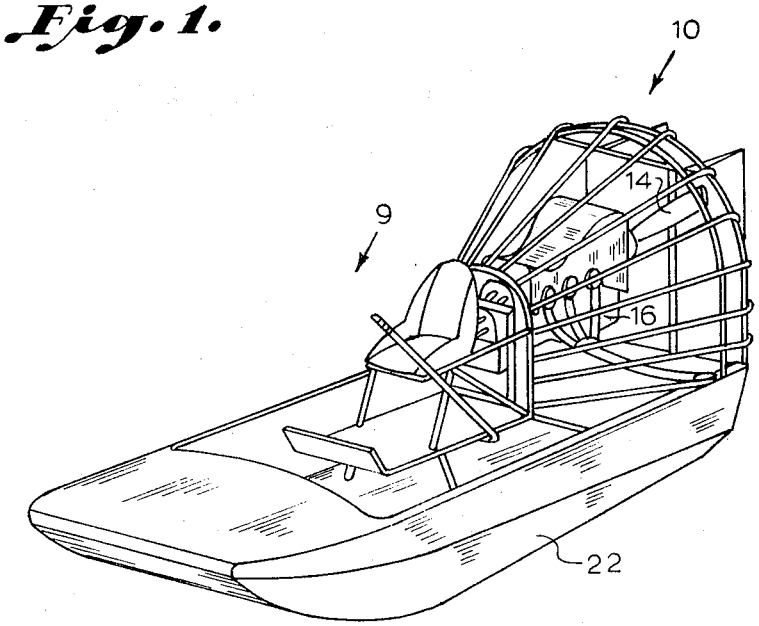
FIG. 1 is a perspective view of an airboat having an engine with an engine cooling shroud in accordance with the present invention.

Referring now to FIG. 1, an airboat 9 has a hull 22 with an engine 16 mounted thereto having a cooling shroud 10 mounted to the engine 16. Engine 16 drives propeller 14 for propelling the hull 22 over water, snow, or the like.

Figure 2:
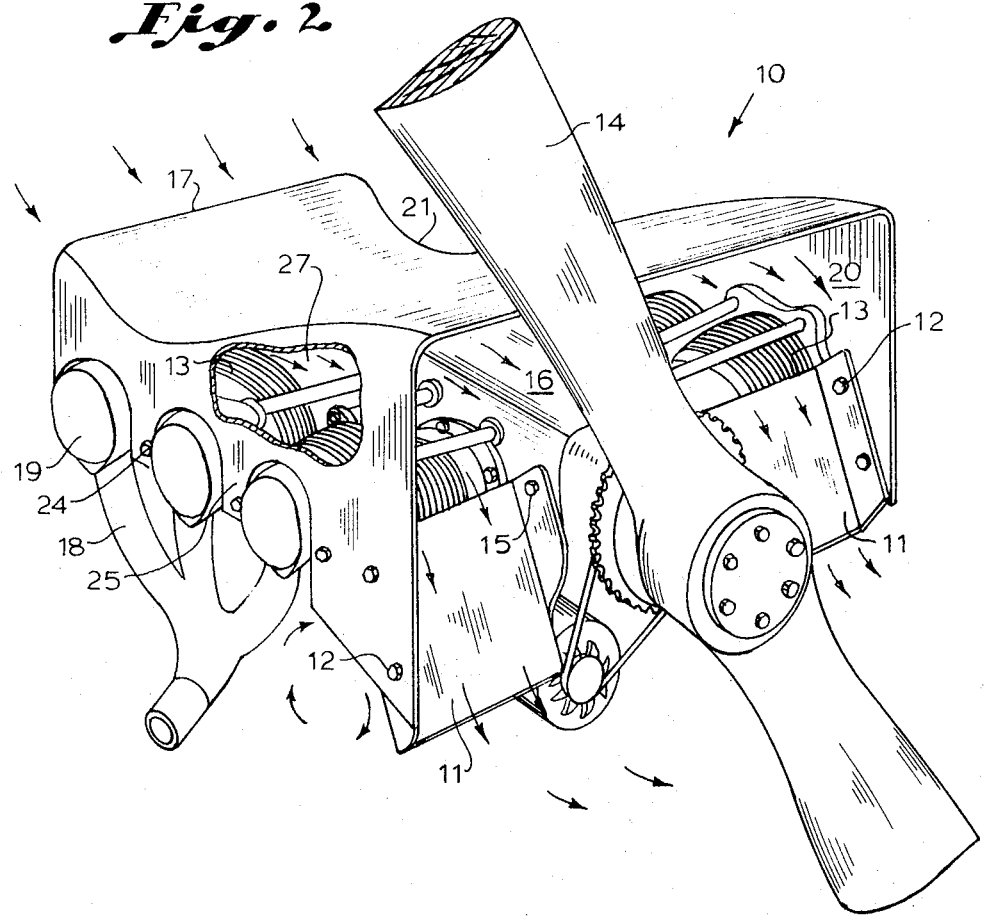
FIG. 2 is a perspective view of the engine with the shroud mounted thereto and having portions cut away.
Figure 3:
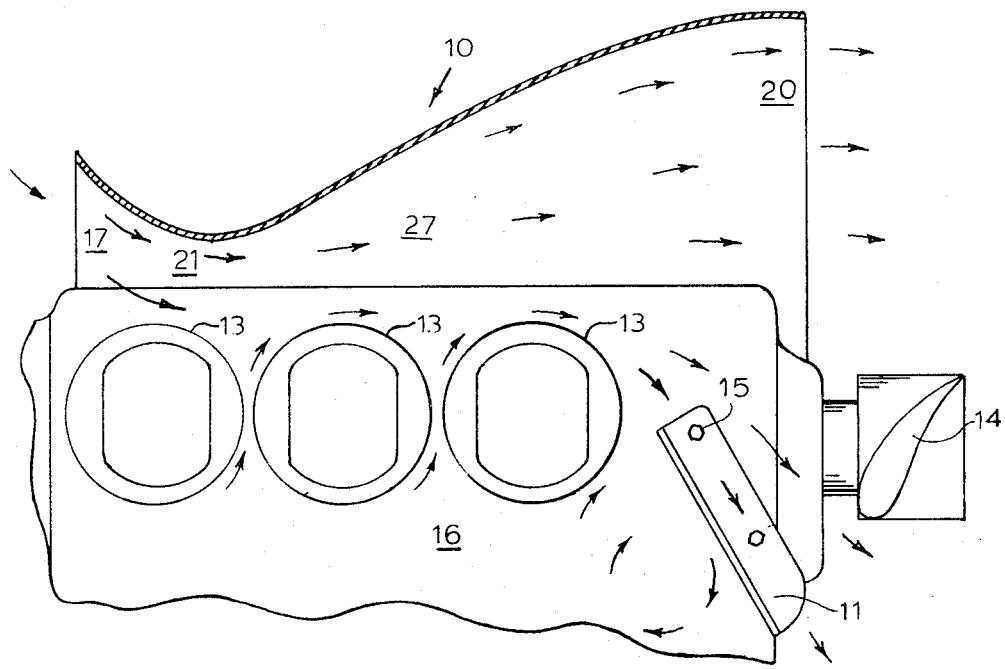
FIG. 3 is a side sectional view of the shroud and engine in accordance with the embodiments of FIG. 2.
Figure 4:
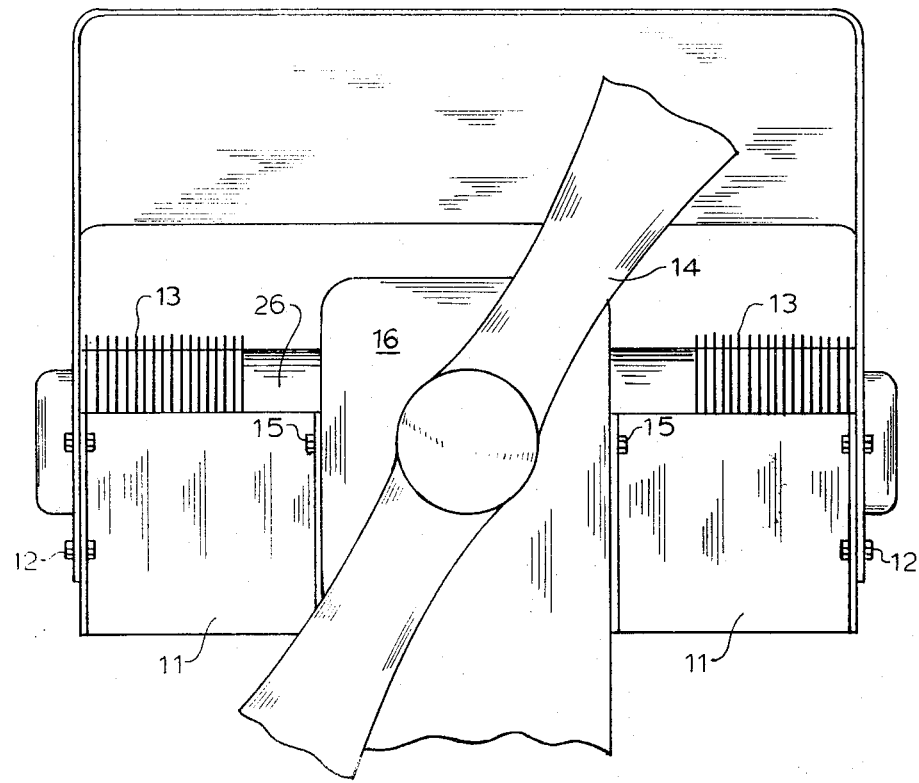
FIG. 4 is a front sectional view of the engine and shroud in accordance with FIG. 2.

Referring now to FIGS. 2, 3 and 4, the cooling shroud 10 mounted to the engine 16 is more clearly illustrated as having an inlet portion 17 which is slightly enlarged relative to a narrowed portion or neck 21 formed by curved top portion of the cooling shroud 10, and an enlarged outlet portion 20. The engine 16 has a plurality of engine cylinders 26 having exterior cooling fins 13 for allowing air to pass through for removing heat from the cylinders 26. It will, of course, be clear that the cylinders and cylinder head are the portions of the engine which reach the highest temperature and require the greatest removal of heat. The cylinder heads 26 have cylinder head or valve covers 19 and an exhaust header 18 mounted thereto. The cooling shroud 10 is connected to the engine 16 by means of bolts or studs 24 passing through downwardly extending arms 25 of shroud 10, which bolts 24 bolt through the shroud and to the engine block of the engine 16. The outlet portion 20 of the shroud 10 has bolts 12 attached to a baffle 11 and bolts 15 attaching the baffle 11 to the engine 16. Baffles 11 are located between the cylinder fins 13 and propeller 14 in an angled position and prevent air from flowing from under the cylinders into the porpeller, thereby forcing air to pass between baffle 11 and the top of the exit portion 20 of the shroud 10. This helps control the flow of the air through the passageway 27 formed by the shroud 10 attached to the engine 16 and to maintain a desired velocity forcing air to flow through the passageway 27 and also to be drawn air through and between fins 13 between cylinders 26. The cooling system of the present invention improves the cooling of the engine by several features including the shroud forming a passageway 27 which forms a venturi 21 located in the vicinity of the first cylinder for increasing the velocity of the air passing the tops of the cylinders 26, but also forcing air to pass between the cylinders 26 and through their cooling fins 13, thus drawing a larger volume and a higher velocity of air in between the cylinders and through the fins to help remove heat from these important areas. The shroud 10 works in cooperation with the baffle plate 11 which prevents the continued flow of air directly over and under the cylinders and thereby produces an air turbulence and forces the flow of air between the cylinders 26. This also reduces the air that could pass from the lower part of the engine directly through the propeller without passing over the cylinders 26 and generates the eddy currents and turbulence behind the plate for further directing the flow of the air. This combination of features along with the smoothly curved surfaces of the shroud have been found to produce substantial improvements in the cooling of airboat engines, thereby extending the life of the engines and the time between overhaul of the engines.

It will of course be clear to those skilled in the art that a cooling system including a cooling shroud or cowling operating in connection with baffles each connected to an aircraft engine in a predetermined manner and having predetermined shapes, effectively increases the cooling of the engine. The cooling shroud 10 and baffles 11 can be made of any material desired but would typically be made of metal such as aluminum or steel. It should also be clear that other embodiments and variations are contemplated and that this invention is not to be construed as limited to the particular forms disclosed herein, since these are to be regarded as illustrative rather than restrictive.

I claim:

1. An airboat having an engine with an engine cooling shroud comprising in combination: an airboat having an engine mounted thereon for driving a propeller attached thereto, said engine having finned cylinders thereon: a single unit cooling shroud fixedly attached to said engine and covering the entire top portion thereof to form a passageway thereover for the passage of air over said engine, said shroud having an enlarged inlet portion for receiving air drawn by said propeller and an enlarged outlet portion for said air to pass out of said passageway and said shroud having a narrowed portion located between and tapering from said inlet and outlet portions for creating a venturi in said passageway for increasing the velocity of air passing therethrough, said venturi being positioned to draw air between fins on said finned cylinders and baffle plate means connected between said outlet portion of said shroud and said engine to support said shroud and direct the flow of air through said shroud whereby the velocity of air passing over predetermined portions of said engine is increased when said airboat engine drives said propeller.

2. The apparatus in accordance with claim 1 in which said baffle plate means includes a pair of baffle plates, each connected between said propeller and said finned cylinders.

3. The apparatus in accordance with claim 2 in which each said baffle plate is attached at an angle to direct the flow of air in a predetermined manner.

4. The apparatus in accordance with claim 3 in which said shroud is attached over said engine and to each side thereof by studs bolted to said engine block.

5. The apparatus according to claim 4 in which said shroud forms a larger outlet portion than inlet portion and curves between the inlet and outlet portions to form a narrowed venturi portion.

6. The apparatus according to claim 5 in which a plurality of arms extend from either side of said shroud for attaching said shroud to said engine, said shroud covering said finned cylinders.

* * * * *